Feb. 26, 1957 A. W. GARST 2,782,859
INCREASING THE PERMEABILITY OF EARTHY FORMATIONS
Filed Feb. 13, 1953 3 Sheets-Sheet 1

ARTHUR W. GARST
INVENTOR.

BY

ATTORNEY

United States Patent Office 2,782,859
Patented Feb. 26, 1957

2,782,859

INCREASING THE PERMEABILITY OF EARTHY FORMATIONS

Arthur W. Garst, Tulsa, Okla., assignor to Stanolind Oil and Gas Company, Tulsa, Okla., a corporation of Delaware Application February 13, 1953, Serial No. 336,805

8 Claims. (Cl. 166—42)

This invention pertains to the treatment of earthy materials to increase their permeability. More particularly, this invention pertains to the dehydration or apparent shrinking of hydrated argillaceous materials in the pores of partially-plugged consolidated formations such as oil-producing formations.

It has been found that the permeability of many oil-producing formations is substantially reduced when these formations are contacted with water, particularly relatively fresh water or water less saline than the connate water, like the filtrate from a water-base drilling fluid. It has been suggested that this water contamination retards or inhibits flow of oil to a well due to a number of causes, including peptization and movement of clays to form physical barriers, water blocking of the small interstices between the sand grains which are preferentially water-wettable, and also the swelling or hydration of argillaceous materials within the pores and capillaries of the formation. Various washes, including treatment with acid, surface-active agents, and hygroscopic agents, have been injected into these formations for the purpose of removing this water.

It is an object of this invention to provide an improved method of increasing the permeability of earthen formations. It is a more particular object of this invention to provide a method of treating a formation in which the pores are partially plugged by hydrated clays and by the treatment, shrink the total volume of water and argillaceous material therein and increase the permeability of such formations to the flow of oil or water. These and other objects of this invention will become apparent from the following description in which reference will be made to the accompanying drawings. In these drawings:

This invention comprises in brief the dehydration or apparent shrinking of hydrated argillaceous materials by decreasing the water of hydration or otherwise reducing the amount of water adsorbed on clay particles. In decreasing the water of hydration, the clayey material is first contacted with a hydrogen donor such as an acid to convert it by ion exchange from the then existing base form, such as the calcium, magnesium, or sodium clay, to the hydrogen-base clay form. Subsequently, the hydrogen-base clay is contacted with a water solution of a salt to convert it to a potassium- or ammonium-base clay or equivalent. I have found that by this treatment it is possible to increase the permeability to fluids of certain formations which had previously been partially plugged by the flow of fresh water, and after this treatment, such formations were no longer adversely affected by the flow of fresh water. Accordingly, certain formations containing such materials are rendered more or less permanently more permeable than they were before being subjected to treatment in accordance with this invention.

Figure 1:
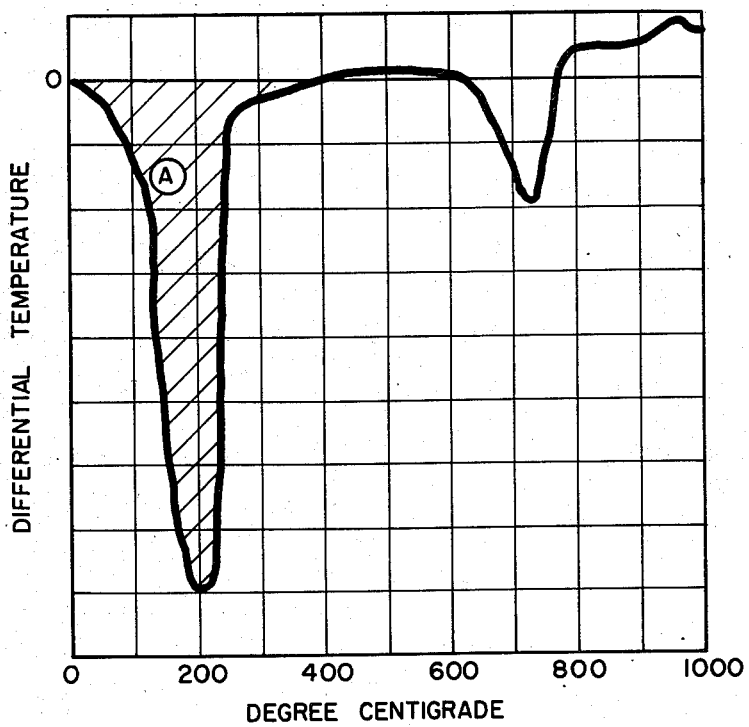
Figure 1 is a thermal analysis curve for a Wyoming montmorillonite sample before treatment.
Figure 3:
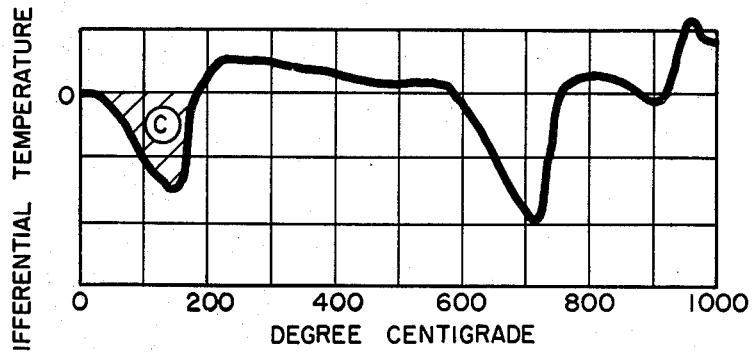
Figure 3 is a thermal analysis curve of the same sample after it had been treated in accordance with this invention.
Figure 2:
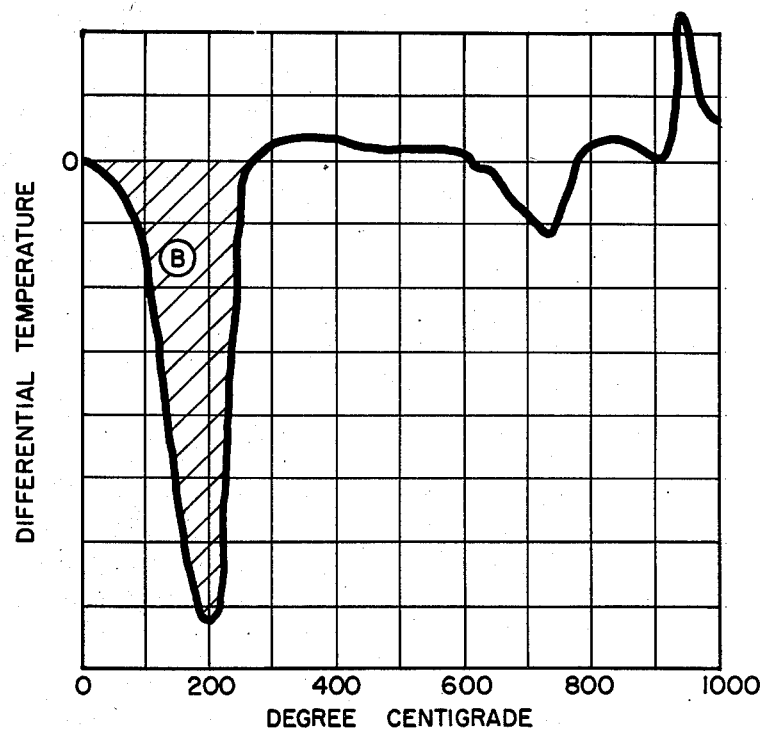
Figure 2 is a thermal analysis curve of the same sample after it had been treated with a 15% hydrochloric acid solution.

Referring now specifically to Figure 1, a standard 1-gram sample of Wyoming bentonite, a sodium-base montmorillonite, was subjected to thermal analysis in accordance with the method described in "Differential Thermal Analysis of Reference Clay Mineral Specimens," a paper by P. F. Kerr, J. L. Kulp, and P. K. Hamilton prepared in connection with their work on American Petroleum Institute Work Project 49 on clay mineral standards. This paper is published in Reference Clay Materials, API, Columbia University, New York, 1951. In brief, this method consists of heating a dried sample and an inert standard such as alumina from 0° C. to 1000° C. and plotting the differential temperature between the specimen and the standard sample during the time the temperatures of the sample and the standard are being raised. If, as in the case of montmorillonite, the specimen contains bound water, sometimes referred to as water of hydration or adsorbed water, the thermal analysis curve shows a negative differential temperature between about 50° and 250° C. The area of the differential analysis curve within this temperature range, as indicated at A in Figure 1, is indicative, as stated by the above-mentioned paper, of the bound water in the sample. That is, due to the vaporization of the adsorbed water or water of hydration in the sample, the sample is endothermic over the temperature range where water is being removed or desorbed. Another 1-gram sample of Wyoming bentonite was then subjected to leaching with three successive 30-milliliter treatments of a 15 percent hydrochloric acid solution. Thermal analysis of the sample after such leaching is shown in Figure 2, which is on the same scale as Figure 1. The area B showing the amount of bound water in the second sample is obviously substantially equal to the area of the bound water peak as indicated at A in Figure 1. That is, a hydrochloric acid treatment that converts at least part of the clay to a hydrogen-base clay does not remove water from a Wyoming bentonite which has been hydrated and, therefore, does not shrink the volume of clay and bound water or increase the permeability of a sandstone formation which contains such argillaceous materials. Another 1-gram sample of the same Wyoming bentonite was given the identical treatment and, subsequent to the leaching with hydrochloric acid, it was leached with three successive 30-milliliter treatments of a 5 percent potassium chloride solution to reduce by base-exchange the acid clay to a less hydrated form, i. e., to release the bound water. The thermal analysis curve for the sample subsequent to the hydrochloric acid and potassium chloride treatment is shown in Figure 3. The area of the bound water peak as indicated at C on the thermal analysis curve, which is plotted on the same scale as the thermal analysis curves above-described, is obviously substantially less than the areas A and B. That is, subsequent to the treatment with an acid and a potassium salt solution the clay contained substantially less bound water and, therefore, occupied a smaller volume. This reduction in volume of water in or on the clay is believed to account for the permeability increase in treated sandstones.

Figure 4:
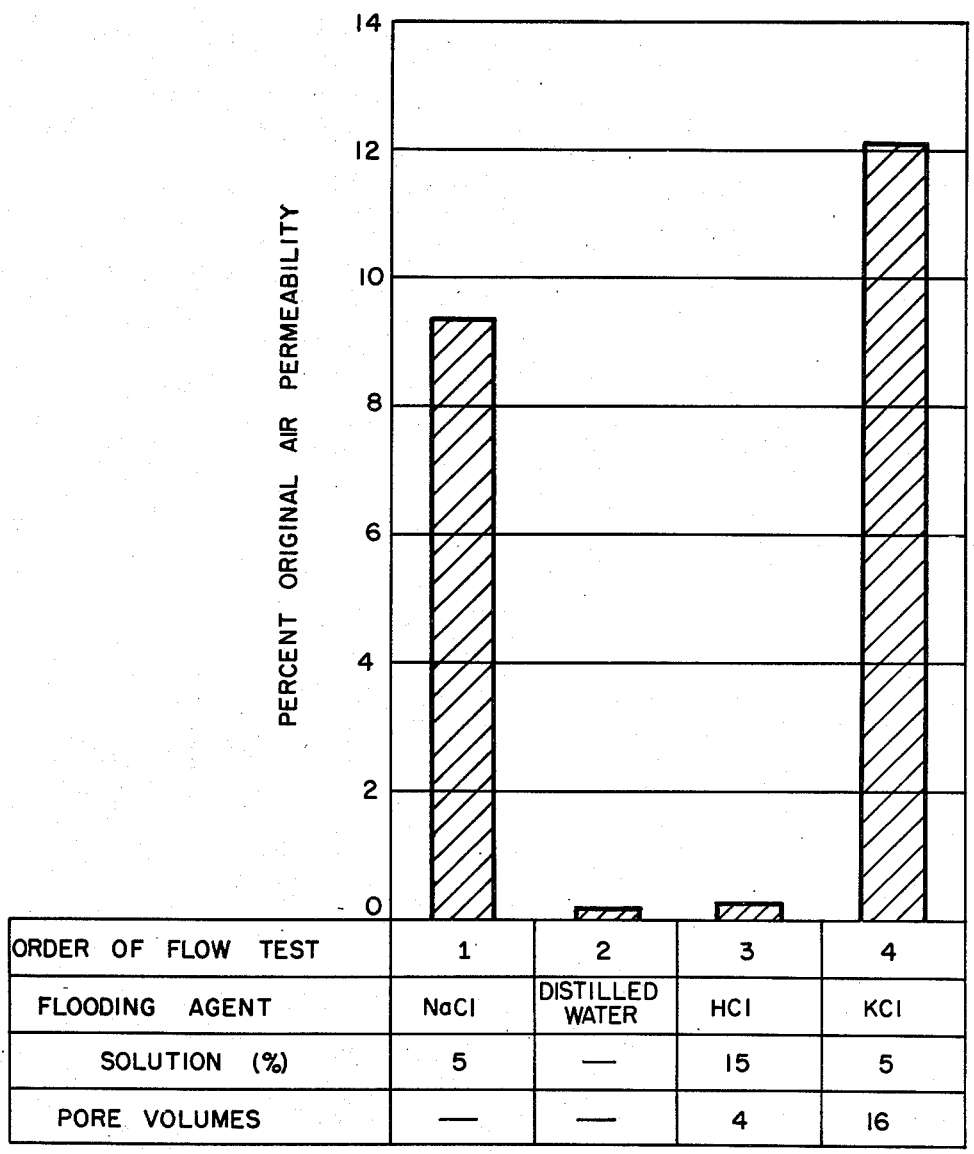
Figure 4 is a bar chart showing the change in permeability of a formation sample during the progress of a treatment in accordance with this invention.

The effect of shrinking the overall volume of clay and bound water on the permeability of a core from the Nellie Bly sandstone formation is shown in Figure 4. The Nellie Bly sandstone tested contained 0 percent calcareous material and 5.5 percent clay, which clay was approximately 30 percent montmorillonite, 20 percent kaolinite, and 50 percent illite. A core of this Nellie Bly sandstone was mounted in a permeability apparatus and various liquids were separately passed through the core. The permeability of the core to an indicated amount of each liquid after treatment is shown in Figure 4. This block diagram obviously corroborates the thermal analysis curves and demonstrates that the volume of clay and/or bound water within a sandstone formation can be shrunk to increase the permeability of the sandstone.

In the preferred embodiment, as indicated above, a formation containing an argillaceous material is first treated with a solution, typically an acid, which yields hydrogen ions. Any acid may be used, including mineral acids such as hydrochloric, nitric, or sulfuric acids, and organic acids such as acetic acid. The strong mineral acids such as hydrochloric acid are preferred. While I do not wish to be limited to any theory of operation, it is believed that the hydrogen of the acid is exchanged for the sodium or other metal adsorbed on the clay, making the clay a hydrogen-base clay which is more susceptible to ion exchange with other ions such as the potassium ion.

The concentration and amount of acid are not particularly critical. I prefer the concentration to be sufficiently high to provide a reasonable reaction rate. A concentration of 3 percent to 20 percent hydrogen chloride based on the weight of the water solution is satisfactory. A 15 percent hydrochloric acid, which is customarily used in this art, is preferred. The amount of acid injected into the formation depends upon the volume of the formation to be treated. This depends, of course, upon the porosity of the formation, the thickness of the formation to be treated, and the radius or distance from the well desired to be treated. Typically, from about 500 to about 10,000 gallons of 15 percent acid may be used.

The salt solution used in the second stage of my treatment to convert the hydrogen-base clay may comprise any salt which yields a cation of large diameter and which will be adsorbed on or base exchanged to the clay, for example, the halogen, nitrate, sulfate, or organic salts of the alkali metal and alkaline earth metal groups, particularly the salts of potassium, ammonium, substituted-ammonium compounds, and barium. In this description and in the claims, the ammonium salts and substituted-ammonium salts are classed with the true metals in the alkali metal group. The halogen salts of the alkali metals, particularly the potassium and ammonium chlorides, are preferred. It should be pointed out, however, that certain other salts possess the same characteristics as potassium and ammonium chloride and hence could be used in my process as substitutes therefor. It is well known, for example, that the hydration of ions tends to decrease with increasing ionic radius for cations of equivalent charge. Thus potassium and ammonium ions are less hydrated than sodium ions among the monovalent ions, while among the divalent ions barium is less hydrated than calcium or magnesium ions. It is also known that certain of the positive ions possess ionic radii so great that in the process of adsorption on the surface of micaceous clays these positive ions cannot be drawn into the surface due to their size, i. e., the ionic diameter is greater than the opening in the oxygen hexagons comprising the greatest surface area of such minerals. The preferred ions are, therefore, those cations having ionic diameters greater than 2.60 Angstrom units, the maximum opening within the oxygen hexagons of micaceous minerals. Cations known to have such large ionic diameters are ammonium, substituted ammonium compounds such as the amines, potassium, barium, cesium, and rubidium.

It is significant that the large ionic diameter cations which appear equivalent to potassium in my treatment are also those cations which are known to have less water of hydration than the smaller diameter cations having equal valence. It is also true that such large diameter cations exhibit a lower zeta potential than the corresponding smaller cations of equivalent valence. All three of these properties, that is, ionic diameter, degree of hydration, and zeta potential, may be and appear theoretically to be related.

These salts are injected into a well or otherwise into an earthy material in a water solution. The concentration of the salt solution is not particularly critical. A strong solution is preferred in order that the reaction rate may be as high as possible to reduce the contact time. Typically, a 3-25 percent salt solution is used. The amount of the salt solution may be varied over a substantial range, depending upon the concentration of the solution, the amount of acid used in the previous step, and the like. For example, between about 500 and about 10,000 gallons of salt solution may be used.

In operation, when it has been discovered that a formation is plugged or partially plugged by contamination with water, and it is suspected that the plugging is caused by hydration of the argillaceous materials within the formation, the formation is treated in accordance with this invention. As indicated, the formation is first treated with a hydrogen donor. This may be accomplished by a number of means. An acid solution may be injected into the formation first. This solution may then be withdrawn from the formation and the well and followed directly or indirectly by injection of the salt solution. By this process the clay in the formation is converted first to the hydrogen base and then to the potassium- or equivalent-base exchanged form. The same result may sometimes be accomplished by first injecting the acid solution into the formation and following it directly with the salt solution so that the salt solution displaces the acid solution back into the formation. This procedure is preferred in water injection wells. It is also preferred in formations which contain calcareous materials, since the acid, upon passing through such materials, becomes partially spent and would not be available for base exchange with the argillaceous materials if the reverse procedure were used. In the alternate or reverse procedure which is sometimes desired, particularly in non-calcareous sandstone formations that produce oil, the salt solution may be injected into a well and followed directly or indirectly with and displaced back into a formation by the acid. In any case, the acid solution should in the first step in the conversion process stand in contact with the clay in the formation adjacent the well for a number of hours, typically from about one hour to about ten hours, to convert the clays adjacent the well to hydrogen-base clays. Subsequently, these clays, which have been in contact with the acid, are contacted with the salt solution either by injecting the salt solution into the well or, in the alternate procedure when the well is produced, the spent acid is removed from the area adjacent the well and replaced by the salt solution. After the spent acid solution has been displaced into the well, the salt solution is allowed to remain in contact with the hydrogen-base argillaceous material by stopping movement of fluid in the formation for a time sufficient to complete the ion exchange between the hydrogen-base clay and the potassium- or the equivalent-base on the clay. It appears that the exchange of the hydrogen ion for the potassium or equivalent ion under normal conditions may be completed within a few hours, typically between about two and about twenty-four hours.

Subsequent to the removal of the salt solution from the formation and the conversion of the clay to the potassium or equivalent base exchanged form, it appears that the clays are permanently fixed, i. e., do not hydrate appreciably even if subsequently contacted with connate or fresh water. The clay materials within the formation seem to behave like illite, which is a potassium-base clay. The clays are, therefore, presumed to have been converted from montmorillonite-like clays to illite-like clays which, as is well known, do not hydrate appreciably in water.

As a further example of the effect of shrinking or converting micaceous materials as above-described, a sample of the Dutcher sand formation from the South Leonard Field, Oklahoma, having an initial air permeability of about 300 millidarcies, was treated in the sequence indicated in the following Table I. The liquids were passed through the core in the amount indicated under "Pore Volumes Through," and the permeability to the treating fluid, percent of original permeability to $C_{10}$—$C_{12}$ hydrocarbons at the end of each treatment and permeability to $C_{10}$—$C_{12}$ hydrocarbons as percent of the permeability of the partially-plugged core after contamination with water are indicated. The ethyl alcohol treatment following the flood with distilled water was for the purpose of removing unbound water from the core and increasing the permeability of the core of the $C_{10}$—$C_{12}$ hydrocarbons. It will be noted that the removal of this unbound water did effect a substantial increase in permeability to $C_{10}$—$C_{12}$ hydrocarbons but that the acid-salt treatment which affected the bound water, materially increased the permeability after the ethyl alcohol treatment. After the sample had been partially plugged by hydrating the clay with 1,604.3 pore volumes of distilled water, the permeability to $C_{10}$—$C_{12}$ hydrocarbons was increased about 129 percent by the ethyl alcohol treatment and an additional 85 percent by the hydrochloric acid-potassium chloride treatment.

Table I

| Treatment | Pore volumes through | Permeability to treating fluid, md. | Permeability to treating fluids as percent of original permeability to $C_{10}$-$C_{12}$ | Permeability to $C_{10}$-$C_{12}$, percent of partially plugged permeability |
|---|---|---|---|---|
| $C_{10}$-$C_{12}$ Hydrocarbons | 275.0 | 305.0 | 100 | |
| Distilled Water | 458.0 | 226.0 | 74.2 | |
| Dist. Water, Reverse Flow | 917.0 | 227.5 | 74.7 | |
| Dist. Water, Normal Flow | 229.3 | 226.0 | 74.2 | |
| $C_{10}$-$C_{12}$ Hydrocarbons | 917.0 | 121.7 | 39.9 | 100 |
| Ethyl Alcohol | 18.3 | | | |
| $C_{10}$-$C_{12}$ Hydrocarbons | 826.0 | 279.5 | 91.5 | 229 |
| 15% Hydrochloric Acid | 9.1 | 210.5 | 69.1 | |
| 5% Potassium Chloride | 31.2 | 447.0 | 146.5 | |
| $C_{10}$-$C_{12}$ Hydrocarbons | 697.0 | 382.0 | 125.2 | 314 |

These data were later confirmed by a field test in the South Leonard Field, Oklahoma, wherein the water injectivity rate in two water injection wells was increased by my treatment as indicated in the following Table II. Well A was first treated by injecting slowly 1,500 gallons of 15 percent hydrochloric acid solution into the well over a period of six hours. The acid was followed directly by pumping slowly 1,000 gallons of a 5 percent potassium chloride solution into the well over a period of six hours. Well B received 2,000 gallons of 15 percent hydrochloric acid solution. After the acid was positioned in the formation, the well was shut in for a period of two hours. One thousand gallons of 5 percent potassium chloride solution were then pumped into the formation and allowed to stand in quiescent contact with the formation adjacent the well for a period of fifteen hours. In both cases the wells were sand pumped after the treatment and before the final production test to remove loose sand from the well.

Table II

| Well | Initial injection rate | Initial rate after treatment |
|---|---|---|
| A | 300 bbl./day at 300 p. s. i. surface pressure. | 1,000 bbl./day at 0-200 p. s. i. surface pressure. |
| A | 50 bbl./day at 560 p. s. i. surface pressure. | 900 bbl./day at 170-300 p. s. i. surface pressure. |

A similar test was conducted on a Nellie Bly sandstone core containing no hydrocarbons and using an acid solution followed by an ammonium chloride solution. As indicated in Table III, the permeability to the treating fluids increased from 93.9 millidarcies to 139.3 millidarcies (48%) by the treatment after being partially plugged with fresh water. It is significant to note that the permeability increase observed was an increase in the specific permeability to the aqueous phase, and in the absence of hydrocarbons, this proves that a real decrease in resistance to flow had been effected entirely divorced from relative permeability effects which are observable when both aqueous and hydrocarbon phases are present. All solutions were passed through the core in the order given in this table.

Table III

| Treatment | Pore volumes through | Permeability to treating fluid, md. | Permeability to treating fluid as percent of permeability to distilled water |
|---|---|---|---|
| 5% Sodium Chloride | 8.31 | 445 | |
| Distilled Water | 27.7 | 93.9 | |
| 15% Hydrochloric Acid | 13.8 | 98.9 | 105 |
| 5% Ammonium Chloride | 20.8 | 139.3 | 149 |

A number of additional tests were performed using Dutcher sand cores containing argillaceous materials to determine the separate effects of various salt solution treatments alone and compare these effects with the acid plus salt treatment. Contamination of these cores with water was carefully avoided during drilling and preparation for tests. The results of these tests showing the permeability of the cores to $C_{10}$—$C_{12}$ hydrocarbons in millidarcies at different times in the sequence of treatments are given in the following Table IV.

Table IV

| Core | Original | After flooding— with about 700 pore volumes of distilled water | with about 25 pore volumes of a 5% solution of various salts | with about 50 pore volumes, of 15% HCl solution | with about 25 pore volumes of a 5% solution of various salts |
|---|---|---|---|---|---|
| A | 17.7 | 9.1 | 9.1 (KCl) | 7.7 | 14.1 (BaCl₂). |
| B | 12.8 | 9.9 | 9.0 (KNO₃) | 9.7 | 12.5 (KNO₄). |
| C | 12.4 | 3.6 | 3.0 (BaCl₂) | 6.0 | 8.2 (p-phenylene diamine). |
| D | 9.1 | 4.0 | 3.1 (p-phenylene diamine). | 6.5 | 6.1 (NaCl). |
| E | 418 | 147 | 46 (RbCl) | 309 | 327 (RbCl). |
| F | 384 | 88.5 | 45.5 (NaCl) | 395 | 575 (KCl). |

It is apparent from these data that the salt treatment alone tended to plug the core, that the acid treatment alone had both good and bad effects but that the combined acid-salt treatment substantially increased the permeability of all these sandstone cores containing clay.

As an example of the operation of this invention a field test was performed in a well in the Beaver Creek Field, Wyoming. The well before treatment was producing 32 barrels of oil and 22 barrels of water from the Mesa Verde formation at a depth of about 3700 feet. The Mesa Verde sandstone formation contains about 5 percent montmorillonite. The test well had been drilled and completed using fresh-water mud. The well had produced at a relatively constant rate pumping for about one year since completion, when the above production test was performed. The well penetrates the Mesa Verde for a depth of 123 feet. While the permeability varies some throughout the length of the well, it is relatively low, averaging about 38.7 millidarcies.

In the treatment the sucker rods were pulled and the water in the hole was removed by swabbing it out through the tubing. The well was immediately filled with crude oil previously produced from the well to prevent encroachment of the connate waters into the well. After the well was filled with oil, 1000 gallons of 15 percent HCl solution were injected into the well and displaced out of the tubing into the formation adjacent the well with 27 barrels of the same crude oil. The well was shut in for a period of two hours after the acid was displaced into the formation. After being shut in for a period of two hours, the well was swabbed through the tubing until all of the spent acid and "load" oil had been recovered. The well was put back on the pump and after production had leveled off, the well produced 70.7 barrels of fluid per day pumping, of which about 60 percent was oil and 40 percent was water. After the production test and four days after the acid treatment, the pump was unseated, the annulus was filled with oil, and 1000 gallons of a 5 percent solution of potassium chloride was pumped into the well through the tubing. The salt solution was displaced out of the tubing and into the formation with 26 barrels of crude oil from the lease. The well was then shut in for a period of 15 hours to permit the salt solution to react with the hydrogen-base clay in the sand. After this shut-in period, the well was placed back on production, pumping. Four days after the well was placed back on production, a production test showed that it was producing at the rate of 92 barrels of fluid per day—the produced fluid being about 40 percent water and 60 percent oil. Two months after treatment, the well was producing 59.5 barrels of oil and 8 barrels of water per day.

From the foregoing, which has been submitted by way of example to explain the operation of certain embodiments of my invention, it can be seen that various modifications are possible without departing from the spirit of the invention. Such modifications as fall within the scope of the appended claims should be construed to be within the scope of this invention.

I claim:

1. A method of treating a formation containing a hydrated argillaceous material to increase its permeability, comprising contacting said formation with a hydrogen donor to cause the adsorbed cations on said argillaceous material to be replaced by hydrogen, and then contacting said formation with a salt of a metal which yields a cation having a diameter greater than 2.69 Angstrom units.

2. A method of treating a formation containing a hydrated argillaceous material to increase its permeability, comprising contacting said formation with a hydrogen donor to cause the adsorbed cations on said argillaceous material to be replaced by hydrogen, and then contacting said formation with a water solution of salts of metals which yield a cation having a diameter greater than about 2.69 Angstrom units selected from the group consisting of potassium and ammonium to cause said adsorbed hydrogen to be replaced by a less hydrated form of cation and thereby release at least a part of the bound water in said argillaceous formation.

3. A method of treating a formation containing a hydrated argillaceous material to increase its permeability, comprising contacting said formation with a hydrogen donor to convert argillaceous material in said formation to a hydrogen-base argillaceous material, and then contacting said formation with a salt of a positive ion selected from the group consisting of potassium, rubidium, cesium, ammonium, substituted ammonium compounds, and barium to cause said hydrogen-base argillaceous material to be converted to a base-exchange form which is less hydrated than the initial hydrated argillaceous formation.

4. A method of treating a formation containing a hydrated argillaceous material to increase its permeability, comprising contacting said formation with acid to convert the argillaceous material therein to an argillaceous material having hydrogen adsorbed thereon, and then contacting said formation with a salt of a metal selected from the group consisting of potassium and ammonium to cause said adsorbed hydrogen to be replaced by said metal and to release at least a part of the bound water within said argillaceous formation.

5. In a method of shrinking hydrated clay in an oil-producing clayey formation to increase its permeability to oil, the steps of acidizing said formation with a strong mineral acid to cause said clay to adsorb hydrogen, and then contacting said formation with a salt of a cation selected from the group consisting of potassium and ammonium to cause said adsorbed hydrogen to be replaced by said metal.

6. A method of increasing the permeability of a water-wet formation containing sodium-base argillaceous material comprising contacting said formation with a hydrochloric acid solution to cause the adsorbed sodium on said argillaceous material to be replaced by adsorbed hydrogen, and then contacting said formation with a potassium chloride solution to cause said adsorbed hydrogen to be replaced by potassium.

7. A method according to claim 6 in which said formation is contacted with from about 500 to about 10,000 gallons each of said hydrochloric acid solution and said potassium chloride solution, said hydrochloric acid solution containing between about 3 and about 20 percent of hydrogen chloride by weight, and said potassium chloride solution contains between about 3 and about 25 percent of potassium chloride by weight.

8. A method according to claim 6 in which said acid is about a 15 percent water solution of hydrochloric acid and said potassium chloride solution is about a 5 percent solution of potassium chloride in water.

References Cited in the file of this patent

UNITED STATES PATENTS 2,470,132    Bergman  -------------- May 17, 1949

OTHER REFERENCES

Colloid Science, McBain, copyright 1950 by D. C. Heath & Co., pages 390–400, pages 391 and 400 are relied on. (Copy in Scientific Library.)

Industrial and Engineering Chemistry, col. 19, No. 12, December 1927, pages 1350–1352. (Copy in Scientific Library.)